United States Patent
Ferch

(10) Patent No.: US 6,311,487 B1
(45) Date of Patent: Nov. 6, 2001

(54) ELECTROMECHANICAL HYDRAULIC DRIVE SYSTEM FOR VEHICLE

(76) Inventor: Paul C. Ferch, P.O. Box 111, LaSalle, CO (US) 80645

( * ) Notice: Subject to any disclaimer, the term of this patent is extended or adjusted under 35 U.S.C. 154(b) by 0 days.

(21) Appl. No.: 09/354,136

(22) Filed: Jul. 15, 1999

(51) Int. Cl.$^7$ .................................................. F16D 31/02
(52) U.S. Cl. .............................. 60/413; 60/483; 415/202; 180/305
(58) Field of Search ............................ 60/413, 414, 415, 60/483; 415/202; 180/305, 306, 307

(56) References Cited

U.S. PATENT DOCUMENTS

| | | | |
|---|---|---|---|
| 1,349,924 | * | 8/1920 | Swanson .......................... 180/305 X |
| 2,279,008 | * | 4/1942 | Nathan ............................. 180/307 X |
| 2,355,357 | | 8/1944 | Adams et al. . |
| 2,456,834 | * | 12/1948 | Napoli ................................. 415/202 |
| 3,379,008 | * | 4/1968 | Manganaro ........................ 60/412 X |
| 3,582,245 | * | 6/1971 | Wallace .............................. 60/483 X |
| 3,659,419 | * | 5/1972 | Ikeda ..................................... 60/405 |
| 3,672,164 | * | 6/1972 | Pieper ................................. 60/39.38 |
| 3,686,860 | * | 8/1972 | White ................................. 60/39.25 |
| 3,828,555 | * | 8/1974 | Capdevielle .......................... 60/413 |
| 3,828,880 | * | 8/1974 | Smith ................................... 180/306 |
| 3,870,116 | * | 3/1975 | Seliber ................................. 180/165 |
| 3,880,250 | * | 4/1975 | Emanuele .......................... 60/415 X |
| 3,892,283 | | 7/1975 | Johnson . |
| 3,948,047 | * | 4/1976 | Gilbert ............................. 180/305 X |
| 3,964,260 | | 6/1976 | Williams et al. . |
| 4,007,591 | * | 2/1977 | Hinchman et al. ................ 60/494 X |
| 4,042,056 | * | 8/1977 | Horwinski ........................... 180/65.2 |
| 4,043,126 | * | 8/1977 | Santos .................................... 60/407 |
| 4,060,987 | * | 12/1977 | Fisch et al. ............................ 60/409 |
| 4,086,764 | * | 5/1978 | Brown et al. ........................... 60/325 |
| 4,175,632 | * | 11/1979 | Lassanske ........................... 180/65.1 |
| 4,183,420 | * | 1/1980 | Kinoshita ............................. 180/301 |
| 4,381,041 | | 4/1983 | Butoi . |
| 4,663,937 | | 5/1987 | Cullin . |
| 4,768,996 | * | 9/1988 | Kumm ................................... 474/49 |
| 5,271,225 | * | 12/1993 | Adamides ............................. 60/416 |
| 5,296,799 | | 3/1994 | Davis . |
| 5,755,303 | * | 5/1998 | Yamamoto et al. ................ 180/65.2 |

\* cited by examiner

Primary Examiner—John E. Ryznic
(74) Attorney, Agent, or Firm—Sheridan Ross P.C.

(57) ABSTRACT

An electromechanical hydraulic drive system for a vehicle is provided which is intended to replace the standard combustion engine of vehicles. One or more batteries power a main pump which provides hydraulic fluid flow to a hydraulic motor. The hydraulic motor includes a central shaft assembly with a plurality of sets of vanes mounted thereon. Fluid enters the hydraulic motor through a plurality of nozzles which are selectively spaced and adjusted for providing fluid to contact the respective sets of vanes at desired angles and at desired flow rates. The central shaft assembly has an output end which connects to a variable speed drive assembly for further modifying the conversion of fluid flow to mechanical movement. The variable speed drive connects directly to the differential of the vehicle for powering the vehicle. A subsystem is provided for recharging the batteries. The drive system may also be used with the existing brake system of the vehicle. Electrical or mechanical linkage is used to interconnect the throttle pedal, brake pedal, and steering column of the vehicle in order to control the forward, reverse, and braking movement of the vehicle.

21 Claims, 4 Drawing Sheets

Fig_1

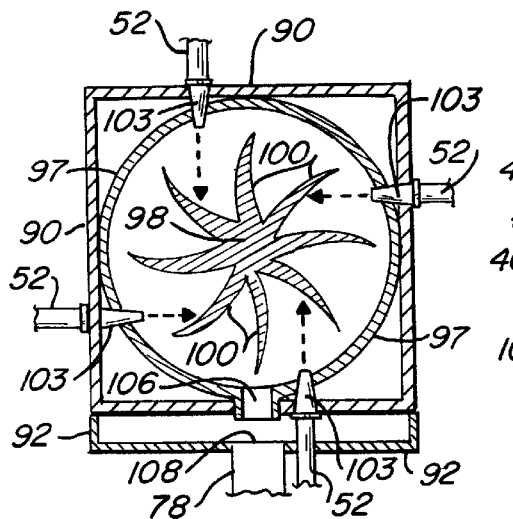
Fig_3
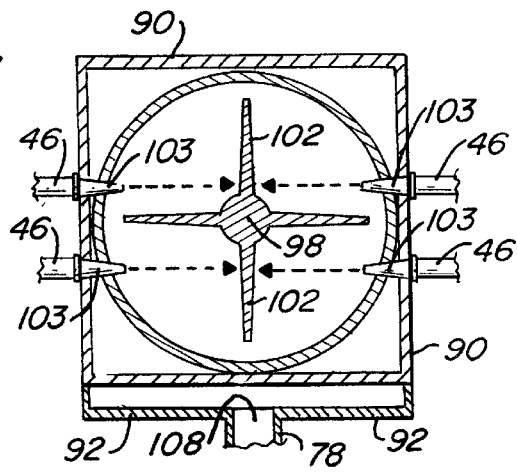
Fig_4
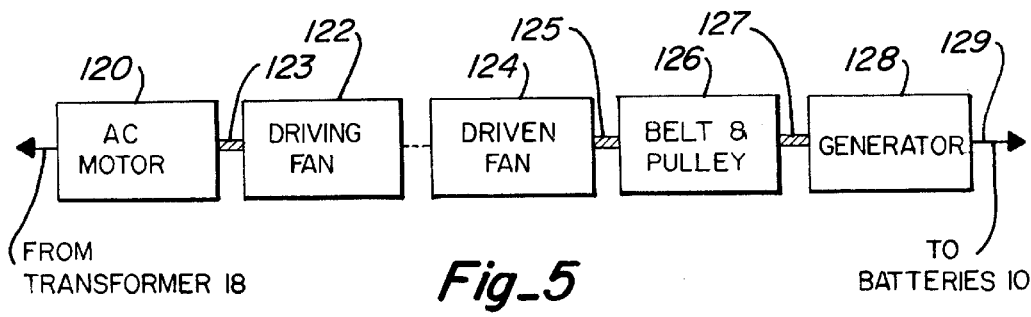
Fig_5
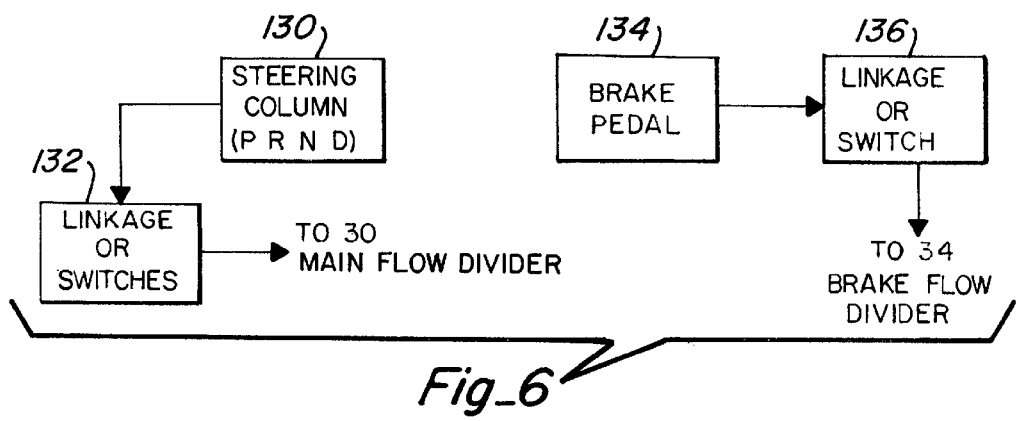
Fig_6

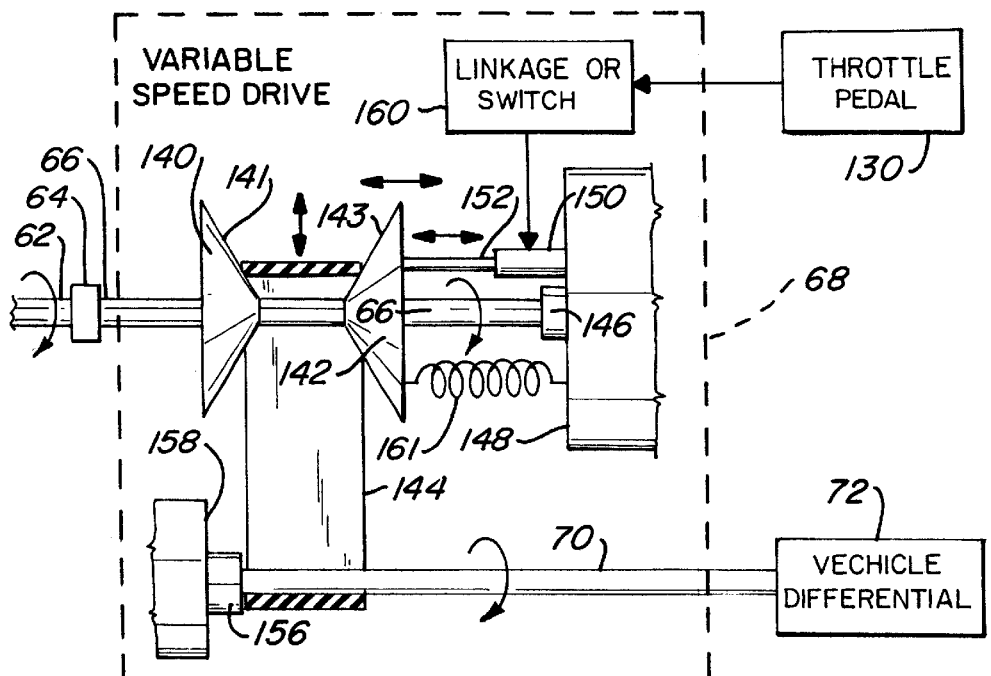
Fig_7
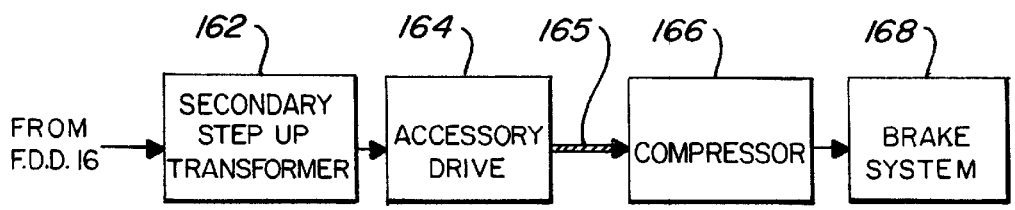
Fig_8

ELECTROMECHANICAL HYDRAULIC DRIVE SYSTEM FOR VEHICLE

TECHNICAL FIELD

An electromechanical hydraulic drive system for a vehicle is disclosed and, more particularly, an electromechanical hydraulic drive system which utilizes electrical energy as the source of fuel or power, and then transforms that electrical energy into mechanical energy through a hydraulic motor. Means are disclosed for regenerating the electrical power source.

BACKGROUND ART

A number of prior art devices exist which may provide means of powering a vehicle, other than the standard combustion engine. One example is U.S. Pat. No. 3,948,047 to Gilbert. This reference discloses a hydraulic drive system wherein a power wheel or turbine is supplied with motive fluid from a hydraulic pump driven by an appropriate prime mover. The power wheel has oppositely disposed valve plates which alternately register with cavities disposed around the periphery of the wheel to define isolated pressure chambers. A drive shaft transversely extends from the wheel and is adapted to be coupled to the driving wheels of the vehicle.

U.S. Pat. No. 4,007,591 discloses a power device utilizing a housing and rotor assembly receiving pressurized, non-compressible liquid from a pump for driving an output shaft which may be employed for many purposes. The housing communicates with and is positioned on top of the tank or sump for the liquid, and the pump includes an intake associated with the tank for circulating the liquid which may be in the form of an oil, such as transmission fluid or the like. A DC electric motor drives the pump. The electric motor is associated with an electric power system for providing electrical energy to the pump motor which includes an alternator or equivalent charging device, battery assembly and an inverter and converter. These supply sufficient electrical energy to the pump motor for driving the pump.

U.S. Pat. No. 3,828,880 discloses a power system for propelling a vehicle which includes a source of electrical energy connected to a motor which powers a liquid pump. The pump forces liquid from a central source through at least one nozzle which directs the pressurized liquid against concave fins of a first turbine wheel. A generator for recharging the source of electrical energy includes a second turbine wheel with concave fins located adjacent the concave fins of the first turbine wheel to receive the pressurized liquid forced through the first turbine wheel fins. A sump pump returns the liquid to the central source.

U.S. Pat. No. 3,892,283 discloses a hydraulic drive system for a vehicle, which utilizes a small engine and pump. The engine drives the pump which pumps hydraulic fluid into a motor coupled to the rear wheels and pumps excessive fluid into an accumulator for later use. The motor can be altered to operate as a pump during braking so that it breaks the vehicle by pumping fluid into the accumulator.

While the foregoing prior art may be adequate for its intended purposes, the invention herein has certain advantages, which will be apparent in review of the following description taken in conjunction with the drawings.

SUMMARY OF THE INVENTION

In accordance with this invention, an electromechanical hydraulic drive system for a vehicle is provided. In the preferred embodiment, a source of energy is provided in the form of electrolytic batteries. The batteries are electrically coupled to a DC motor which drives an alternator. A frequency determining device such as a tank circuit electrically communicates with the alternator to produce an alternating current of desired frequency. A step-up transformer is connected to the output of the frequency determining device to adjust the voltage as desired. A surge protection device may also be electrically coupled to the transformer to regulate voltage spikes or other irregularities An AC motor electrically communicates with the step-up transformer from the secondary windings. The secondary windings of the transformer can also be used to power other electrical systems in the invention, as further explained below. The AC motor provides power to a main hydraulic pump. The hydraulic pump pumps fluid to a hydraulic motor which is used to transfer mechanical energy to the differential of a vehicle. An accumulator may be placed downstream of the pump in order to provide storage capacity for pressurized fluid. Pressurized fluid is transferred to the hydraulic motor by a plurality of manifolds and valves/flow dividers. In the preferred embodiment, a forward manifold is provided for allowing fluid to flow to the portion of the hydraulic motor which causes the vehicle to be propelled in a forward direction. Similarly, there is a reverse manifold which allows fluid to flow to the portion of the hydraulic motor which causes the vehicle to be propelled in a reverse direction. There is also a brake manifold which allows fluid to flow to the hydraulic motor in order to slow down or stop the hydraulic motor from propelling the vehicle.

The hydraulic motor has a central shaft with a plurality of sets of varying shaped impellers or vanes welded thereto. Particular sets of impellers or vanes are provided in separated chambers within a casing of the hydraulic motor. A plurality of strategically placed nozzles deliver flow of pressurized fluid into the chambers and against the vanes/impellers to cause central shaft rotation. Some of these vanes may be configured to provide optimum rotation of the central shaft in one direction, while other vanes or impellers within other chambers are configured to provide optimum rotation in an opposite direction. Yet other vanes or impellers may be configured to place a braking force on the central shaft. By configuring the hydraulic motor with the desired number of chambers, impeller/vane configurations, and nozzle placements, the hydraulic motor may achieve turning of the central shaft at the desired torque, speed, and direction.

A plurality of flow nozzles are spaced around each chamber of the hydraulic motor to provide fluid flow which more precisely controls the spin imparted on the central shaft. For example, flow nozzles may be placed at two or more locations around each chamber which compliment the vane configuration to impart a spin on the central shaft at the desired force and in the desired direction. Each nozzle is provided fluid through its own hydraulic line connected to the corresponding manifold.

Furthermore, a variable speed drive may communicate with an output shaft of the hydraulic motor in order to further control the torque and speed of the mechanical force transferred to the vehicle differential.

The batteries providing the electrical source of power may be recharged as with a standard vehicle, or may be recharged with the system herein described. This system includes the provision of a small AC motor powered by a tap from the secondary windings of the transformer. This AC motor has an output shaft and a driving fan secured thereto which spins and produces a flow of air. This driving fan propels or pushes the flow of air onto a driven fan, which in turn connects to a belt and pulley system driving a generator. This generator electrically connects to the batteries for recharging purposes. The driven fan may be positioned on the front end of the vehicle such that it is powered not only by the driving fan, but also by the force of air striking the vehicle as it is propelled.

The variable speed drive is controlled by operation of the throttle pedal. The variable speed drive acts as a transmission to more precisely control the force transferred to the vehicle differential. Mechanical linkage can interconnect the variable speed drive to the throttle pedal, or pressure or electrical switches can provide the interconnection. Additionally, a PLC or other control circuitry could be used to influence the variable speed drive based on inputs from the throttle. Similarly, the brake pedal communicates with the braking elements of the hydraulic motor as by an electrical switch, pressure switch, or mechanical linkage.

In order to enhance the braking capability of a vehicle which incorporates the drive system of this invention, one may wish to also have a standard brake system which is controlled by the brake pedal in the conventional manner. That is, a standard air/hydraulic brake system found in passenger vehicles or trucks can be used which is powered by another electric motor energized by a tap from the secondary windings of the transformer, or by a tap from another step up transformer dedicated for powering the electric motor.

Fluid passing through the hydraulic motor is returned to the main hydraulic pump by a drain line interconnecting a drain from the output of the hydraulic motor to the main hydraulic pump. This outlet maybe at a location higher than the pump which allows the gravity to return the flow, or a small booster pump may assist in transferring the fluid back to the main pump. This booster pump may also be powered by a tap from the secondary windings of the transformer. A radiator may be employed to cool the fluid returning to the main hydraulic pump. The bottom portion of the hydraulic motor casing serves as a fluid receiving vessel so that a separate holding or storage device for the hydraulic fluid is not needed between the main pump and the drain from the hydraulic motor.

By the foregoing, an electromechanical hydraulic drive system for a vehicle is provided which greatly simplifies the normal means of powering a vehicle. The source of power or energy is simply electrolytic batteries. An AC motor and a hydraulic motor work together to convert electrical energy from the batteries into mechanical energy for powering the vehicle. The hydraulic motor takes advantage of simple construction yet allows forward, reverse and braking forces to be applied to the vehicle differential. Although the normal means for recharging the batteries can be used, this invention also provides an alternate means for recharging the batteries. These with other advantages will become more apparent in a review of the description and claims which follow.

BRIEF DESCRIPTION OF THE DRAWINGS

FIG. 3 is a vertical section, taken along line 3—3 of FIG. 2, illustrating interior details of the hydraulic motor;

FIG. 4 is a vertical section, taken along line 4—4 of FIG. 2, further illustrating interior details of the hydraulic motor;

FIG. 5 is a schematic diagram of the components which are used to recharge the batteries according to an alternate system;

FIG. 6 is a schematic diagram, illustrating the relationship of the steering column and brake pedal for controlling the vehicle;

FIG. 7 is a schematic diagram of the variable speed drive; and

FIG. 8 is yet another schematic diagram of the components used to interconnect the invention to a standard brake system of the vehicle.

DETAILED DESCRIPTION OF THE DRAWINGS

Figure 1:
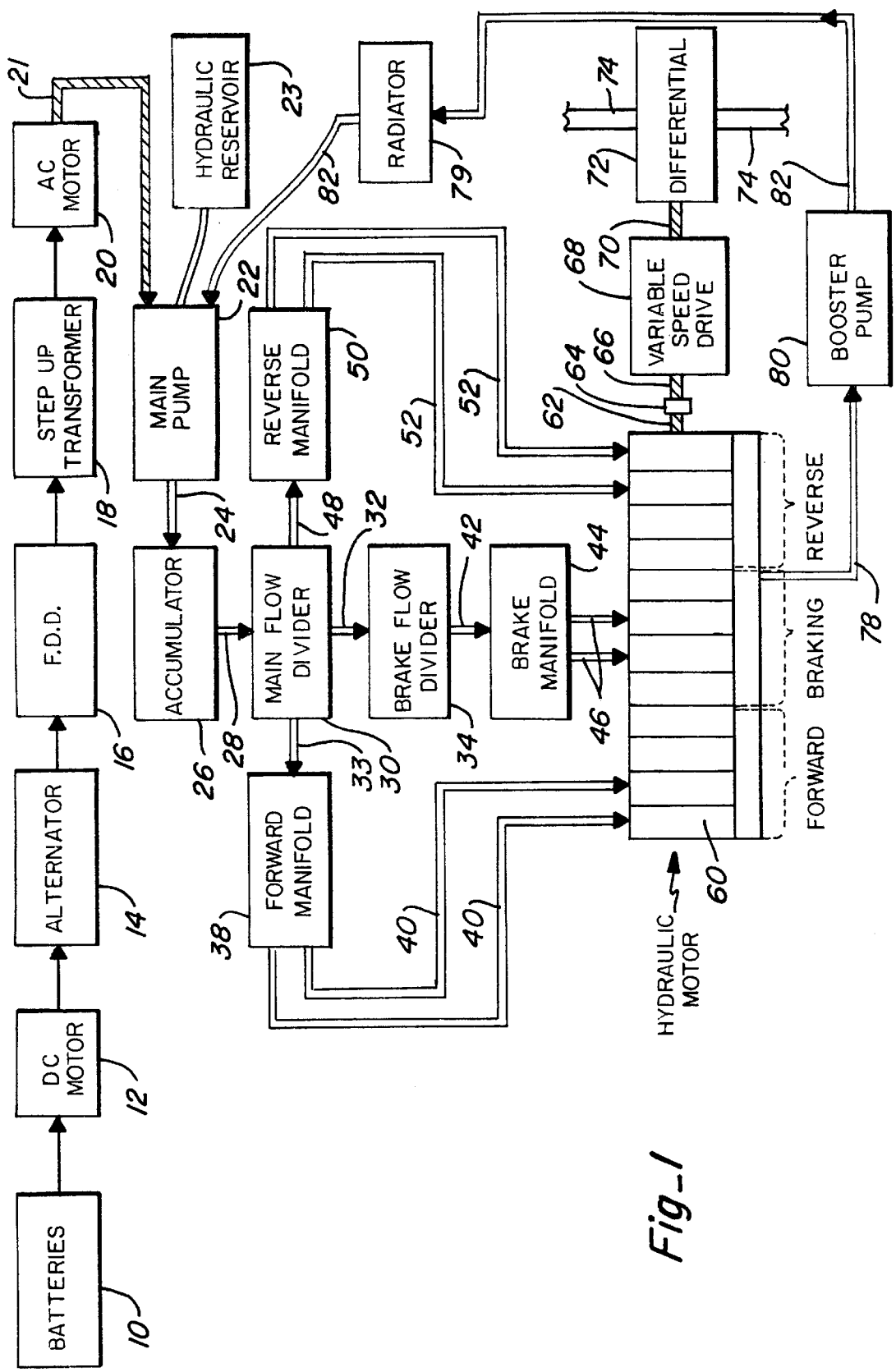
FIG. 1 is a schematic diagram illustrating the major components of the electromechanical hydraulic drive system of this invention.

FIG. 1 illustrates the major components making up the electromechanical hydraulic drive system of the invention. As shown, one or more batteries 10 electrically connect to a direct current motor 12. Motor 12 communicates with alternator 14 so that alternator 14 produces an AC current. A frequency determining device (F.D.D.) 16, such as a common tank circuit, electrically communicates with alternator 14 in order to produce an AC current source of a desired frequency. A step up-transformer 18 electrically connects to the frequency determining device 16 in order to adjust the voltage of the current source. Transformer 18 may be any well-known step-up-type transformer. An AC motor 20 electrically connects to taps (not shown) from the secondary windings of transformer 18. An output shaft 21 of AC motor 20 drives main hydraulic pump 22. Hydraulic pump 22 may be any well-known positive displacement or vane-type pump. Hydraulic fluid is stored in hydraulic reservoir 23. Hydraulic line 24 interconnects accumulator 26 to pump 22. Accumulator 26 is optional to provide additional storage capacity for pressurized fluid from the pump. Hydraulic fluid passes through line 28 from accumulator 26 to a main flow divider or directional valve 30. Main flow divider 30 allows hydraulics to flow either to: (1) reverse manifold 50 by line 48; (2) brake flow divider or directional valve 34 from line 32; or (3) forward manifold 38 from line 33. In addition to directing fluid flow, main flow divider 30 can control the amount of flow to each downstream location to include prevention of any downstream flow. Main flow divider 30 and brake flow divider 34 can be in the form of omni directional hydraulic valves commercially available for common industrial equipment. The outlet side of forward manifold 38 has a plurality of lines 40 which connect to respective chambers within hydraulic motor 60. Likewise, reverse manifold 50 on its outlet side has a plurality of branch lines 52 which connect to respective chambers of the hydraulic motor 60. Brake flow divider 34, like main flow divider 30, can control the amount of downstream flow. Brake flow divider 34 communicates with brake manifold 44 by line 42. The outlet of brake manifold 44 includes a plurality of hydraulic lines 46 which also communicate with desired chambers of the hydraulic motor 60. Hydraulic fluid from lines 46 serve to slow down or stop the output shaft 62. Forward manifold 38, brake manifold 44, and reverse manifold 50 are of similar construction. They comprise a single inlet where hydraulic fluid is allowed to enter, and have a plurality of outlets which evenly distribute the flow of hydraulic fluid into a plurality of outlet lines.

Pressurized hydraulic fluid enters the hydraulic motor 60 through the various lines 40, 46 and 52 at the desired sequence to cause the hydraulic motor 60 to impart a forward or reverse motion on the vehicle. Hydraulic motor 60 has a single output shaft 62 which mechanically links with variable speed drive 68, through coupler/linkage 64 and driven shaft 66. Variable speed drive 68 acts as a transmission which transfers the spinning motion of driven shaft 66 to variable speed drive shaft 70 at a desired speed and/or torque. Shaft 70 mechanically links with the differential 72 of the vehicle, which in turn imparts spinning motion to the axle 74. The axle 74 connects to the wheels (not shown) or tracks (not shown) of the vehicle.

Fluid flows through hydraulic motor 60 and exits through drain line 78. A booster pump 80 may then assist the return flow of hydraulic fluid through line 82. Alternatively, the level of the main pump 22 may be placed below the level of drain line 78 which allows gravity as a force for returning hydraulic fluid to the main pump 22. Optionally, a radiator 79 may be placed in line with line 82 in order to cool the fluid returning to main pump 22.

Figure 2:
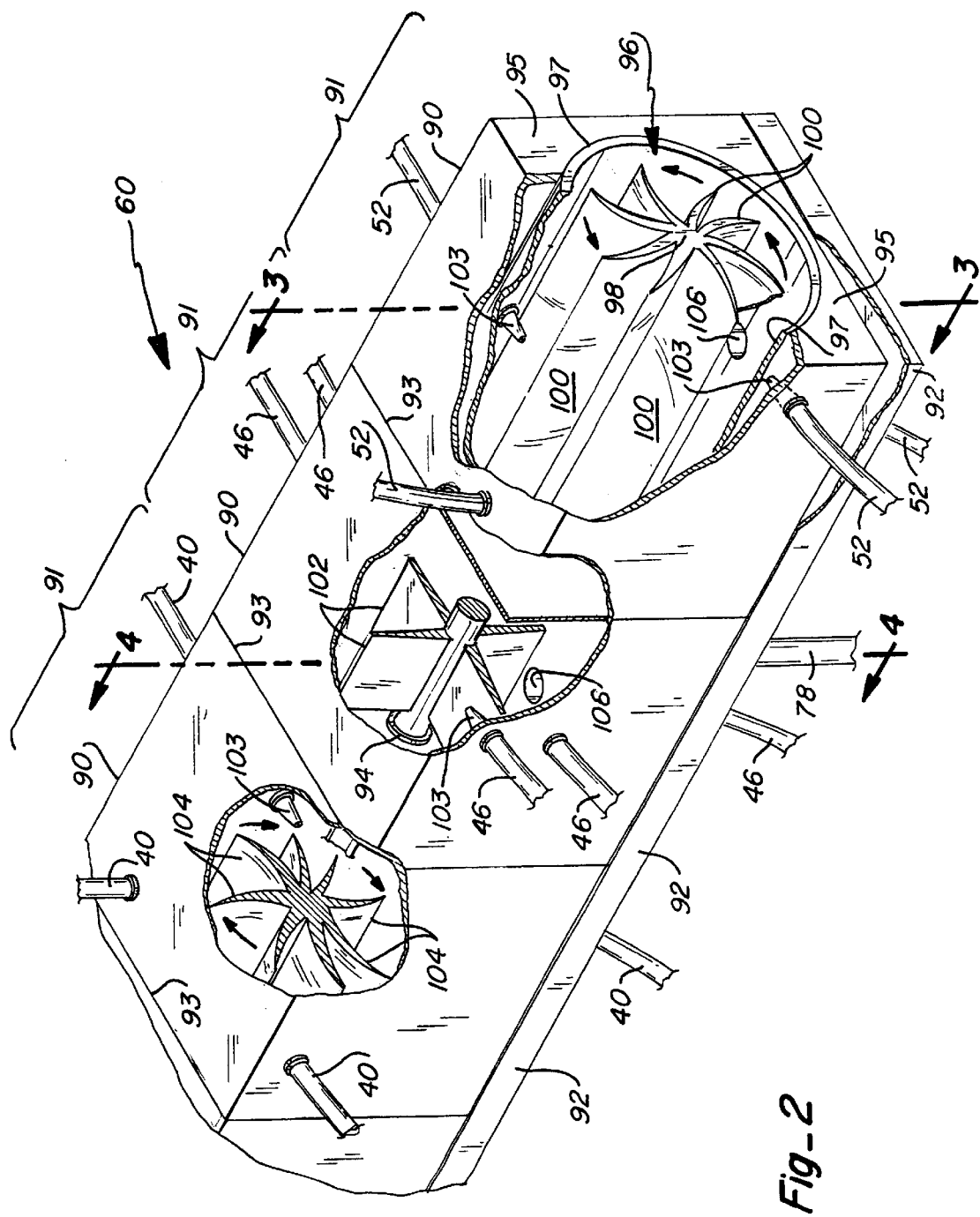
FIG. 2 is a simplified fragmentary perspective view of the hydraulic motor of this invention.

FIG. 2 shows some of the details of hydraulic motor 60. As shown, motor 60 includes a casing 90 which houses the internal moving parts therein. A fluid receiving pan 92 forms the bottom portion of the motor. This pan receives the hydraulic fluid which flows through the device, and channels the fluid to the drain line 78. A plurality of chambers 91 are formed along the length of the casing 90 by a plurality of dividing walls 93. A chamber is defined as the space between any two dividing walls 93 or between a dividing wall 93 and end wall 95. Extending through the length of the hydraulic motor is a central shaft assembly 96. As shown, the central shaft assembly 96 includes a shaft member 98, and a plurality of sets of impellers/vanes 100, 102, and 104, respectively, axially spaced to be located in the respective chambers 91. An opening in each of the walls 93 allows the shaft member 98 to extend through. A plurality of seals 94 prevent hydraulic flow between the chambers, yet allows the shaft member 98 to freely spin. FIG. 2 has been simplified to illustrate three different types of chambers, one for reverse movement, one for forward movement and one for braking force. It shall be understood that one or more of each of these types of chambers may be provided within the hydraulic motor 60. More typically, there would be more forward movement chambers than braking or reverse chambers. A splash guard 97 may be provided within each chamber. The splash guards are a plurality of cylindrical members which help to confine the hydraulic fluid around the impellers, and also helps to prevent cavitation or other flow irregularities within each of the chambers. As further shown in FIG. 2, a preferred arrangement is the use of four hydraulic lines 46 with respective nozzles 103 which enter each chamber. Each of these lines enter the hydraulic motor from opposing sides to provide a more steady flow of hydraulic force to turn the shaft assembly 96. The plurality of nozzles 103 direct the hydraulic fluid into the interior of the hydraulic motor to make contact with the respective sets of impellers/vanes 100, 102 and 104 at desired angles. The force of the fluid against impellers 100 and 104 imparts spinning motions on the shaft, as is well understood in the art. The pitch or angle of the vanes can be reversed and/or the positioning of the nozzles can be changed to create the desired force imparted upon the shaft. Each of the nozzles may be adjustable to control the flow rate of fluid therethrough. Thus, in addition to flow rate control by the various flow dividers, flow rate can also be controlled by the respective nozzles. As also shown in FIG. 2, a set of alternate shaped vanes 102 are provided in the braking chamber. When fluid flow is directed against these vanes 102 by oppositely arranged nozzles 103, these vanes 102 have a tendency to slow down or stop the motion of the spinning shaft assembly 96. Each chamber has its own drain 106 which allows the hydraulic fluid to pass therethrough into fluid receiving pan 92. A screen or grate may be provided (not shown) as necessary to filter any impurities or other contaminants which may enter the closed loop hydraulic system. The fluid receiving pan 92 has a main drain opening 108 (FIG. 3) which connects to drain return line 78.

The hydraulic motor 60 includes bearings (not shown) which are secured on both end walls 95 for mounting the central shaft assembly 96.

If it desired to move the vehicle in a forward direction, then hydraulic fluid is allowed to flow through forward manifold 38, through lines 40, and through the chambers in hydraulic motor 60 which turn the plurality of impellers 104. If it is desired to slow down the rotational speed of the shaft, then fluid may be selectively applied through one or more lines 46 and to the various chambers having impellers/vanes 102. If it is desired to completely reverse the movement of the vehicle, fluid flow can be shut-off to forward manifold 38 by main flow divider/valve 30, and fluid can be allowed to flow through flow divider/valve 32 to reverse manifold 50, and then through lines 52 to contact impellers 100. As with slowing of the forward direction, it may also be necessary to slow the reverse direction of the vehicle. Accordingly, fluid may be allowed to selectively flow through brake flow divider/valve 34 through manifold 44 and into lines 46. Although FIG. 1 illustrates an equal number of forward 40, braking 46 and reverse 52 lines, it shall be understood that more power is normally required for movement of the vehicle in the forward direction. Therefore, a greater number of chambers communicating with lines 40 can be provided. Additionally, lines 40 may be of larger diameter to increase the hydraulic flow rate. Other methods can be derived which allow greater volumes of hydraulic flow through lines 40 in order to provide a greater forward movement capability.

FIG. 3 is a vertical section taken along line 3—3 of FIG. 2, illustrating some of the interior details of the hydraulic motor 60. As shown, the nozzles can be arranged to provide hydraulic flow to the vanes 100 in order to impart the desired spinning motion on the shaft member 98.

FIG. 4 is a vertical section taken along line 4—4 of FIG. 2, illustrating a braking chamber wherein the opposing nozzles are arranged to strike vanes 102 in order to slow down or stop the shaft from spinning.

FIG. 5 is a schematic diagram illustrating one manner in which batteries 10 may be recharged. FIG. 5 can be considered a subsystem of the overall electromechanical hydraulic drive system of the invention. A tap from the secondary windings of the transformer 18 may power a small AC motor 120 which has a driving fan 122 mounted to the output shaft 123 of the motor 120. Driving fan 122 pushes air flow against driven fan 124. Driven fan 124 imparts spinning motion on attached shaft 125. Shaft 125 connects to a belt and pulley 126 to impart spinning motion on shaft 127 of generator 128. Alternatively, shaft 125 may connect directly to generator 128. Generator 128 produces an electric DC current which is transmitted back to the batteries 10 by electrical lines 129. In order to provide additional wind force or air pressure against driven fan 124, it may be mounted at the front end of the vehicle, such as behind the grille. As the vehicle moves in the forward direction, the flow of ambient air created by the moving vehicle through the grille will also cause driven fan 124 to spin. Although this particular charging system is shown, it shall also be understood that a more conventional battery charging system may be used.

FIG. 6 is another schematic diagram illustrating how the existing steering column of the vehicle and the brake pedal of the vehicle communicate with the drive system of this invention. A standard steering column on most vehicles includes a lever which allows the driver to place the vehicle in "park," "reverse," "neutral" and "drive." As shown, the existing steering column 130 which may have selectable positions "park," "reverse," "neutral," or "drive" connects to linkage or switches 132 which, in turn, communicate with main flow divider 30. For example, if the driver places the vehicle in "drive," the linkage or switches interconnecting the steering column 130 to the main flow divider 30 would allow main flow divider 30 to pass fluid to forward manifold 38. Similarly, if the driver places the vehicle in "reverse," the result would be in main flow divider 30 allowing fluid flow to reverse manifold 50. If the driver places the vehicle in "park" or "neutral," this would result in main flow divider 30 preventing any flow to the manifolds 38 and 50, or to brake flow divider 34. Also, main pump 22 could have a switch (not shown) in communication with the linkage or switches 132 which would shut off the pump when the vehicle is placed in "park" or "neutral." Otherwise, the main pump 22 would continue to pump fluid into accumulator 26. As also shown in FIG. 6, brake pedal 134 may control brake flow divider 34 through an electrical or pressure switch or mechanical linkage 136. Switch or linkage 136 would, in turn, communicate with brake flow divider 34 to control fluid flow from brake flow divider 34 into brake manifold 44.

A more sophisticated control system could be used to control flow of fluid into the hydraulic motor 60. For example, an integrated logic circuit (not shown) could be used in order to control flow dividers 30 and 34. Steering column 130 and brake pedal 134 would provide the inputs to the integrated logic circuit, as by limit switches, pressure switches, or other types of switches in contact with the steering column and brake pedal. These inputs would then be processed by the integrated circuit and the circuit would then produce output signals to control flow dividers 30 and 34.

As shown in FIG. 7, the variable speed drive 68 acts as a transmission to more precisely control the speed of the shaft 70 which drives the vehicle differential 72. As shown, a stationary sheaf 140 is rigidly mounted to shaft 66. Spaced from and also mounted on shaft 66 is a movable sheaf 142 which may slide along shaft 66 as further explained below. A belt 144 is mounted around shaft 66, and between and in contact with contacting surfaces 141 and 143 of stationary sheaf 140 and movable sheaf 142, respectively. Belt 144 is shown in vertical cross-section to illustrate that it maintains contact with surfaces 141 and 143. Shaft 66 terminates with a bearing 146 which is mounted within the variable speed drive 68 on a bearing mount 148. Movable sheaf 142 is moved left or right along shaft 66 by means of hydraulic ram or piston 150. Ram 150 includes a rod extension 152 which contacts the movable sheaf 142. Ram 150 is controlled by an electric or pneumatic signal from switch or logic circuit 160. Actuation of the throttle pedal 130 is the input to switch or logic circuit 160 which determines the distance at which movable sheaf 142 should be displaced to effect a desired speed change. The other end of belt 144 is mounted over and in contact with variable speed drive shaft 70. Shaft 70 is secured at one end in bearing 156 which is mounted on bearing mount 158 within the variable speed drive 68. The other end of shaft 70 is connected to the vehicle differential 72 as shown. In order to increase the rotational speed of shaft 70 communicating with the vehicle differential 72, the throttle pedal would be pressed down causing a corresponding electric or pneumatic signal(s) to be sent to switch or logic circuit 160. In turn, the switch or logic circuit 160 would send an electrical or pneumatic signal(s) to ram 150 which would activate rod extension 152 forcing movable sheaf 142 to the left the desired distance. As the movable sheaf 142 moves to the left, belt 144 rides higher upon sheaves 140 and 142. As belt 144 rides higher upon sheaves 140 and 142, the belt will spin faster because the effective diameter of sheaves 140 and 142 in contact with the belt increases. This increased spinning speed on belt 144 is transferred directly to shaft 70. In order to slow down the vehicle, the throttle pedal may be released causing another signal(s) to be sent to switch or logic circuit 160, which in turn results in another signal(s) being sent to ram 150 allowing the movable sheaf 142 to move to the right the desired distance. Switch or logic circuit 160 could alternatively be a mechanical linkage. Accordingly, belt 144 will again ride lower on sheaves 140 and 142, which will result in belt 144 spinning at a slower speed. Because the belt 144 is of a constant length, an idler roller (not shown) can be used to exert a steady force against the belt in order to keep the belt at a desired tension as it moves up and down along sheaves 140 and 142. A normal position can be defined as the rod extension 152 being in a retracted position, thus allowing the movable sheaf 142 to move to the right. In order to assist with returning and maintaining sheaf 142 at this normal position, a spring 161 could interconnect sheaf 142 to bearing mount 148.

As shown in FIG. 8, the invention can also be used with the existing brake system 168 of a vehicle in order to enhance the braking capability of the invention. As shown, a secondary step up transformer 162 electrically communicates with frequency determining device 16. The secondary step up transformer provides the desired voltage to an accessory drive 164, which could be an AC or DC motor. The output shaft of the accessory drive 164 drives a compressor 166. The compressor 166 then provides compressed air as needed for the existing brake system 168. Thus, the invention is compatible for use with the existing vehicle brake system and power can be provided through the components shown in FIG. 8.

This invention has been described in detail with reference to particular embodiments thereof, but it will be understood that various other modifications can be effected within the spirit and scope of this invention.

What is claimed is:

1. An electromechanical hydraulic drive system for a vehicle comprising:

a pump for providing a flow of one directional fluid through said system;

a hydraulic motor having a central shaft extending longitudinally therethrough, and a plurality of sets of vanes attached to said shaft, said sets of vanes being spaced along said central shaft and being configured for forcing said shaft to spin in a desired direction for reverse, forward, or braking motion of the vehicle, said hydraulic motor being in fluid communication with said pump for receiving a flow of fluid therefrom and converting the energy of the fluid flow to mechanical energy by the spinning of said central shaft; and a variable speed drive connected to said central shaft of said hydraulic motor, said variable speed drive including a variable speed drive shaft communicating with a differential of the vehicle, said variable speed drive further including means for transferring the mechanical energy of said central shaft to the variable speed drive shaft at a desired speed and direction.

2. An electromechanical hydraulic drive system for a vehicle of the type having a differential which transfers driving power to wheels or tracks of the vehicle, said system comprising:

a first electric motor;

a pump for circulating fluid throughout said system, said pump being connected and driven by said first electric motor; and a hydraulic motor for providing power to drive said vehicle and being in fluidic communication with fluid from said pump, said hydraulic motor having a central shaft extending longitudinally therethrough, said central shaft having an end which connects to the differential of the vehicle for providing power thereto, said hydraulic motor further having a plurality of sets of vanes attached to said shaft, said sets of vanes being spaced along said shaft and being configured for forcing said shaft to spin in a desired direction and speed when contacted by fluid from said pump, and plurality of sets of vanes including at least one vane having a pitch configured to impart a force on said central shaft for forward spinning of said central shaft, at least one vane having a pitch configured to impart a force on said central shaft for reverse spinning of said central shaft, and at least one vane having a pitch configured impart a braking force on said central shaft.

3. An electromechanical hydraulic drive system for a vehicle of the type having a differential which transfers driving power to wheels or tracks of the vehicle, said system comprising:

a first electric motor;

a pump for circulating fluid throughout said system, said pump being connected and driven by said first electric motor; and a hydraulic motor for providing power to drive said vehicle and being in fluidic communication with fluid from said pump, said hydraulic motor having a central shaft extending longitudinally therethrough, said central shaft having an end which connects to the differential of the vehicle for providing power thereto, said hydraulic motor further having a plurality of sets of vanes attached to said shaft, said sets of vanes being spaced along said shaft and being configured for forcing said shaft to spin in a desired direction and speed when contacted by fluid from said pump, said pump providing a selective one directional flow of fluid through said hydraulic motor causing said central shaft to be spun at the desired speed and direction.

4. A system, as claimed in claim 3, further including:

at least one battery; and a transformer interconnecting said at least one battery to said first electric motor for providing power to drive said first electric motor.

5. A system, as claimed in claim 3, further including:

at least one battery;

a second direct current motor electrically connected to said battery, said direct current motor including an output shaft;

an alternator connected to said output shaft of said second direct current motor and driven thereby, said alternator providing electrical energy in the form of alternating current;

a frequency determining device electrically connected to said alternator for conditioning said alternating current to a desired frequency; and a transformer electrically connected to said frequency determining device for increasing or decreasing the alternating current voltage from said frequency determining device, said transformer being electrically connected to said first electric motor to provide power thereto.

6. A system, as claimed in claim 3, wherein:

said hydraulic motor is divided into a plurality of chambers, each of said chambers including one of said sets of vanes, each set of vanes being configured to impart a force on said central shaft of a desired direction and magnitude, for forward spinning of said central shaft, reverse spinning of said central shaft, or for applying a braking force to said central shaft.

7. A system, as claimed in claim 3, further including:

a forward flow manifold;

a reverse flow manifold; and a brake manifold, each of said manifolds interconnecting said pump to said hydraulic motor for controlling fluid flow into said hydraulic motor, said forward flow manifold providing fluid flow to a first of said sets of vanes for forward spinning of said central shaft, said reverse flow manifold providing fluid flow to a second of said sets of vanes for reverse spinning of said central shaft, and said brake manifold providing fluid flow to a third of said sets of vanes to apply a braking force to said central shaft.

8. A system, as claimed in claim 3, further including:

a variable speed drive interconnecting said central shaft to the differential of the vehicle, said variable speed drive including a pair of sheaves mounted on said central shaft, one sheaf of said pair of sheaves being selectively slidable along said shaft;

a variable speed drive shaft mounted within said variable speed drive and connecting to the differential; and a belt interconnecting said pair of sheaves and said variable speed drive shaft, said one sheaf being selectively slidable along said central shaft causing said belt to ride higher or lower on said pair of sheaves thereby changing the effective diameter of the pair of sheaves in contact with said belt, said belt then causing said variable speed drive shaft to spin at varied speeds based on the selective sliding of said one sheaf.

9. A system, as claimed in claim 3, further including:

a drain line communicating with said hydraulic motor allowing fluid to flow away therefrom and back to said pump; and a radiator connected in line with said drain line for cooling the fluid returning to said pump.

10. A system, as claimed in claim 9, further including:

a booster pump connected in line with said drain line for assisting return flow of fluid to said main pump.

11. A system, as claimed in claim 3, wherein:

fluid is supplied to said hydraulic motor by a plurality of nozzles in fluidic communication with said pump, and said nozzles being selectively spaced around said hydraulic motor.

12. A system, as claimed in claim 11, wherein:

said hydraulic motor includes a casing, said nozzle being spaced around said casing to strike said plurality of vanes at desired angles.

13. A system, as claimed in claim 11, wherein:

said nozzles are adjustable to provide a desired flow rate of fluid into said hydraulic motor.

14. A system, as claimed in claim 12, further including:

a splash guard mounted within said casing and surrounding said central shaft to prevent cavitation or other undesirable flow irregularities from occurring within said hydraulic motor.

15. A system, as claimed in claim 4, further including a subsystem for recharging said at least one battery, said recharging subsystem including:

a recharging motor electrically connected to and receiving power from said transformer, said recharging motor having an output shaft;

a driving fan mounted to said output shaft for producing a flow of air as said output shaft spins;

a driven fan placed adjacent said driving fan, said driven fan being driven by the flow of air from said driving fan and by flow of ambient air as the vehicle moves;

a generator connected to said driven fan and powered thereby for providing an electric recharging current back to said at least one battery.

16. A system, as claimed in claim 8, wherein the vehicle has a throttle pedal and said system further includes:

linkage interconnecting said variable speed drive to the throttle pedal of the vehicle wherein actuation of the throttle pedal controls the variable speed drive.

17. A system, as claimed in claim 16, wherein:

said linkage is mechanical such that when the throttle pedal is actuated, the rotational speed of said variable speed drive shaft increases, and release of the throttle pedal results in reduction of rotational speed of said variable speed drive shaft.

18. A system, as claimed in claim 16, wherein:

said linkage includes an electrical switch interconnecting the throttle pedal and said variable speed drive, wherein actuation of the throttle pedal causes said electrical switch to send electrical signals to said variable speed drive, said variable speed drive, in turn, causing the rotation of said variable speed drive shaft to increase, and release of the throttle pedal results in said electrical switch sending electrical signals to said variable speed drive causing the rotation of said variable speed drive shaft to decrease.

19. A system, as claimed in claim 18, wherein:

said electrical switch includes circuitry for selectively controlling the electric signals sent to said variable speed drive.

20. A system, as claimed in claim 7, wherein the vehicle has a brake pedal and said system further includes:

linkage interconnecting the brake pedal of the vehicle to said brake manifold, wherein actuation of the brake pedal causes fluid flow through said brake manifold in order to assist in the braking of the vehicle, and release of the brake pedal prevents fluid flow through said brake manifold.

21. A system, as claimed in claim 4, further including:

an accessory drive powered by said at least one battery; and a compressor driven by said accessory drive, said compressor providing compressed air to the existing brake system of the vehicle.

* * * * *

UNITED STATES PATENT AND TRADEMARK OFFICE
CERTIFICATE OF CORRECTION

PATENT NO. : 6,311,487 B1
DATED : November 6, 2001
INVENTOR(S) : Paul C. Ferch

It is certified that error appears in the above-identified patent and that said Letters Patent is hereby corrected as shown below:

Column 9,
Line 19, after "pump," delete "and" and insert -- said -- therein.
Line 25, after "configured" insert -- to -- therein.

Signed and Sealed this

Twenty-seventh Day of August, 2002

Attest:

JAMES E. ROGAN
Attesting Officer
Director of the United States Patent and Trademark Office